Patented Sept. 25, 1951

2,568,746

UNITED STATES PATENT OFFICE 2,568,746

EMULSION BREAKING

Willard H. Kirkpatrick, Sugar Land, Tex., and Doyne L. Wilson, Pasadena, Calif., assignors to Visco Products Company, Houston, Tex., a corporation of Delaware No Drawing. Application April 8, 1949, Serial No. 86,392

9 Claims. (Cl. 252—341)

This invention relates in particular to the treatment of emulsions of mineral oil and water, such as petroleum emulsions commonly encountered in the production, handling and refining of crude mineral oil, for the purpose of separating the oil from the water. Also the invention relates to the treatment of other water-in-oil types of emulsions wherein the emulsions are produced artificially or naturally and the resolution of the emulsions presents a problem of recovery or disposal.

Petroleum emulsions are in general of the water-in-oil type wherein the oil acts as a continuous phase for the dispersal of finely divided particles of naturally occurring waters or brines. These emulsions are often extremely stable and will not resolve on long standing. It is to be understood that water-in-oil emulsions may occur artificially resulting from any one or more of numerous operations encountered in various industries. The emulsions obtained from producing wells and from the bottom of crude oil storage tanks are commonly referred to as "cut oil," "emulsified oil," "bottom settlings," and "B. S."

One object of our invention is to provide a novel and economical process for resolving emulsions of the character referred to into their component parts of oil and water or brine.

Another object is to provide a novel reagent which is water-wettable, interfacial and surface-active in order to enable its use as a demulsifier or for such uses where surface-active characteristics are necessary or desirable.

This process involves subjecting an emulsion of the water-in-oil type to the action of a demulsifying agent of the kind hereinafter described, thereby causing the emulsion to resolve and stratify into its component parts of oil and water or brine after the emulsion has been allowed to stand in a relatively quiescent state.

The treating agents employed in accordance with this invention are characterized by having a pair of

groups linked through their carbon atoms to alpha and beta carbon atoms, at least one of which alpha-beta carbon atoms is linked to an unsaturated olefinic radical containing at least five carbon atoms. These compounds may also be classified as alkenyl succinic acids, their salts, and esters. The preferred treating agents may be illustrated by the following general formulae.

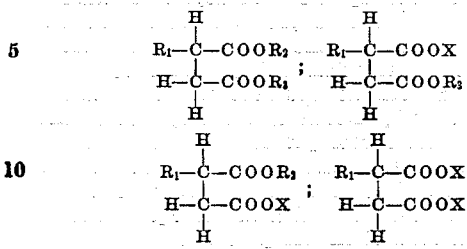

in which $R_1$ is an unsaturated olefinic radical having at least 5 carbon atoms in the chain and not more than 30 carbon atoms in the chain, preferably 6 to 12 carbon atoms, X is a hydrogen ion equivalent or salt-forming radical, and $R_2$ and $R_3$ are the same or different hydrocarbon radicals, preferably containing 6 to 30 carbon atoms in the molecule.

These compounds may be prepared from alkenyl succinic anhydride. The alkenyl succinic anhydride may be made by the addition of an unsaturated olefinic hydrocarbon to maleic anhydride. By making a careful fractionation of an olefinic hydrocarbon it is possible to control the number of carbons in the alkenyl radical. In this manner, it is possible to secure alkenyl succinic anhydrides with a wide range of carbon atoms in the alkenyl radical. This is of importance in order to secure the desired balance of hydrophobe and hydrophile characteristics.

It is to be noted that the alkenyl succinic acid is dibasic in character and is therefore capable of forming monosalts and di-salts. If neutralization is carried to completion with one salt-forming reactant, then both replaceable hydrogen ions will be substituted by the same cation of the salt-forming reactant. In some instances it has been found that the hydrophobe, hydrophile balance may be better secured by preparing a di-salt having suitable cations. Thus, for example, one can neutralize one hydrogen ion with sodium, which is a hydrophile radical, and the other hydrogen ion with aniline, which is a hydrophobe radical. In still other instances it may be desired to leave one hydrogen ion of the dibasic acid unneutralized. Thus, for example, monosodium hydrogen alkenyl succinate can be easily prepared by neutralizing substantially 50% of the acidity of the alkenyl succinic acid.

The reactions which occur to yield the ester compounds employed in the practice of the present invention may be illustrated generally as follows:

(I) 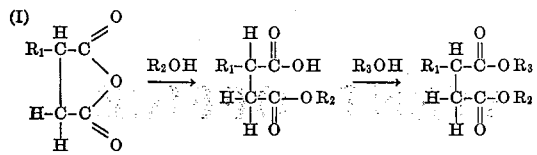

(II) 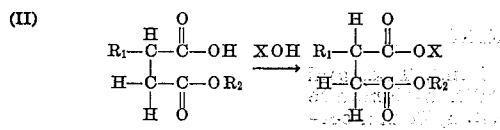

Reaction I portrays the formation of mono- and di-esters of an alkenyl succinic anhydride. The preparation of the monoester is accomplished very easily by heating an alkenyl succinic anhydride and a molar equivalent of the desired alcohol at a temperature of approximately 150 degrees C. for not more than three hours. It should be noted that in the preparation of esters from alcohols boiling below 150 degrees C. the reaction vessel should be provided with a return condenser to prevent the loss of any unreacted alcohol. The formation of the di-ester is somewhat more difficult as it is necessary to force the reaction either by means of a catalyst or in the presence of an azeotropic solvent which facilitates the removal of the water formed from the esterification. The preferred procedure is to heat the mono-ester and a molar equivalent of the desired alcohol in the presence of an azeotropic solvent until a molar equivalent of water has been driven from the reaction mass. The reaction vessel should be equipped with a trap and a reflux condenser to permit the return of the azeotrope to the reaction mass. The preparation of the di-ester may be carried out in one reaction rather than proceeding stepwise. Under such circumstances, it is advisable to heat the anhydride, alcohol and solvent at a moderate temperature such as 150 degrees C. for a short period of time in order to open the anhydride linkage. Then the temperature may be elevated to form the di-ester. In those instances where it is desired to prepare a di-ester in which the radicals are derived from dissimilar organic hydroxy bodies, it is essential that the operations be carried stepwise. For example, the mono-ester should first be prepared from the lower boiling alcohol and the second esterification carried out with the higher boiling alcohol.

It will be seen from Reaction II that the mono-ester still retains an acidic carboxyl group which may be neutralized with a basic material to yield a mono-ester of alkenyl succinic acid. After the preparation of the mono-ester as described above, the ester-acid may be neutralized with any basic material to yield an ester-salt of alkenyl succinic acid. This reaction can be accomplished by following a simple titration in order to avoid any excess of the basic salt-forming reagent. Almost without exception, the salt formation may be carried out to substantial completion at atmospheric temperature by agitating the reactants. If there is cause to believe that the reaction has not proceeded to completion, elevated temperatures may be used to assure completion of the reaction. At no time was it found necessary to raise the temperature in excess of 150 degrees C. Obviously, the rate of the reaction is considerably increased by applying extreme heat. Most of these reactions are exothermic and the resulting temperature is usually effective in insuring a substantial 100% yield of the desired ester-salt of alkenyl succinic acid.

In order to secure the desired hydrophobe-hydrophile balance in these ester-salts of alkenyl succinic acid it is possible to vary the ester radicals from the very hydrophilic methyl group to the very hydrophobic long chain alcohols such as those derived from the saponification of waxes, e. g., myricyl alcohol. Likewise, the salt-forming radicals may be varied from the very hydrophilic alkali metal salts to the very hydrophobic amines such as aniline or dicyclohexylamine. Thus, for example, a very wide range of materials can be prepared for practically any desired hydrophobe-hydrophile balance.

The mono- and di-esters of alkenyl succinic acids employed in accordance with this invention are reaction products of alkenyl succinic anhydride or alkenyl succinic acid and any hydroxy organic material that is capable of reacting to form an ester. Examples of the type of hydroxy organic bodies which are suitable for this purpose are alkyl alcohols, cycloalkyl alcohols, aryl alcohols, usually described as phenols, and aralkyl alcohols in which the hydrocarbon radical may be saturated or unsaturated, or may have substituents of a non-polar character such as —$NO_2$, —Cl, —Br, etc. Specific examples of a suitable alcohol are isopropyl alcohol, butyl alcohol, lauryl alcohol, octadecyl alcohol, cyclohexanol, phenol, benzyl alcohol, allyl alcohol, o-bromobenzyl alcohol, terpineol and the like.

Salt-forming reactants which are useful in the practice of our invention include the basic compounds of the alkali metal group (e. g., sodium hydroxide, potassium hydroxide), basic compounds of the alkali earth group (e. g., barium hydroxide, calcium hydroxide), ammonia, alkyl amines (e. g., ethylamine, butylamine, laurylamine, octadecylamine), cycloalkyl amines (e. g., cyclohexylamine), aromatic amines (e. g., aniline, toluidine, anisidine and phenetidine), aralkyl amines (e. g., benzylamine), alkylolamines (e. g., monoethanolamine, diethanolamine, triethanolamine, and higher homologues), polyalkylene polyamines (e. g., diethylene triamine, tetraethylene pentamine), and basic heterocyclic compounds having no more than one basic nitrogen in the ring in which the hydrocarbon radical may be saturated or unsaturated and may have substituents of a non-polar character. Specific preferred examples of basic materials which are satisfactory for the purpose of this invention include butylamine, cyclohexylamine, toluidine, benzylamine, pyridine and the like.

The preceding examples of hydroxy organic bodies and salt-forming reactants have been set forth as being typical of products being suitable for our use. It is to be understood, however, that we are not limited to the specific chemicals mentioned as it will be obvious that equivalents of these chemicals and other members of the same homologous series may be used without departing from the spirit of the invention and the scope of the appended claims. Likewise, in the following examples we do not confine ourselves to the proportions of reactants specified nor to the conditions of reaction described for other proportions and conditions will be obvious to those skilled in the art.

The organic compounds which have been described do not have to be isolated as relatively pure material. There is no particular necessity nor desire to have these materials available as a crystalline body. In each instance the salts have been prepared in a rather concentrated solution which would facilitate further handling. This for the reason that it is much simpler to add a volume of a concentrated solution rather than a weight of a dry material which will require subsequent dissolving in the medium in which it is to be used. Solvents other than water could be used for the preparation of these concentrated solutions. For example, isopropyl alcohol, acetone and a lower weight glycol have been found satisfactory as solvents for most of these salts.

An interesting characteristic of the mono-salt mono-ester is that the surface-activity is more pronounced when partial neutralization is accomplished rather than when the salt is carried to complete neutralization. This phenomenon is undoubtedly associated with the pH of the material under consideration.

This invention will be illustrated by means of the following specific examples in which the quantities are expressed in parts by weight unless otherwise indicated. It should be understood, however, that these examples are given primarily by way of illustration and the invention is not to be limited thereto.

In the following examples an alkenyl succinic anhydride had been preferably used in which the alkenyl radical contains 10 to 12 carbon atoms in the chain. Alkenyl succinic acids or anhydrides having other length alkenyl radicals have also been used to yield satisfactory products. However, the 10 to 12 carbon chain is preferred in that the products prepared therefrom have the desired hydrophobe-hydrophile balance.

Example I

To 342 parts of steam distilled pine oil having a specification of 85% alpha-terpineol content there was added 352 parts of alkenyl succinic anhydride with a $C_{10}$ to $C_{12}$ range alkenyl group. The temperature was elevated to effect the loss of an aqueous-like distillate. The theoretical quantity of water was secured from the reaction mass over a period of 6 hours, with distillation beginning at 195 degrees C. and a maximum temperature of 206 degrees C. To the di-terpineol ester there was added 400 parts of a suitable hydrocarbon fraction such as $SO_2$ extract for purpose of placing the ester in solution to facilitate handling.

Example II

To 344 parts of undecyl alcohol there was added 252 parts of alkenyl succinic anhydride having an alkenyl group of the $C_{10}$ to $C_{12}$ range. The temperature was gradually raised to effect the loss of an aqueous-like distillate. Water began to form at about 200 degrees C. and after 6 hours at a maximum temperature of 215 degrees C. a theoretical amount of water has been removed. 400 parts of a suitable hydrocarbon fraction such as $SO_2$ extract was added to the reaction mass as a solvent yielding the di-ester in a form easy to handle.

Example III

In a two-liter three-necked flask provided with a stirrer and return condenser, connected to the flask by means of a water trap, there was placed 504 parts of alkenyl succinic anhydride having an alkenyl group of the $C_{10}$ to $C_{12}$ range and 120 parts of 99% isopropanol. The mixture was heated with stirring for 3 hours at 150 degrees C. Any isopropanol which is condensed in the moisture trap is returned periodically to the reaction mass. The failure of any further quantities of isopropanol to be condensed and collected in the moisture trap is an indication of the completion of the reaction forming the mono-ester. To this mono-ester was added 340 parts of steam distilled pine oil having a specification of 85% alpha-terpineol content and 100 parts of a hydrocarbon fraction which was suitable for azeotropic distillation. The temperature was then elevated until 36 parts or two equivalents of an aqueous distillate had been secured in the moisture trap. This distillate was collected over a period of four hours and at a maximum temperature of 180 degrees C. The resulting product was the mixed di-ester of alkenyl succinic anhydride.

Example IV

The preparation of the mono-isopropanol ester of alkenyl succinic anhydride was carried out as follows. To 504 parts of alkenyl succinic anhydride having a side chain of approximately $C_{10}$ to $C_{12}$ range there was added 132 parts of 99% isopropanol. This mixture was heated under reflux at 135 degrees C. for three hours. The formation of the mono-ester proceeded practically to completion and was indicated when isopropanol no longer refluxed. 200 parts of a suitable hydrocarbon fraction such as $SO_2$ extract was added as a vehicle to yield the solution of the mono-isopropanol ester of alkenyl succinic anhydride.

Example V

To 340 parts of steam distilled pine oil having specification of 85% alpha-terpineol content there was added 500 parts of an alkenyl succinic anhydride whose hydrocarbon chain contains on the average 11 carbon atoms. The mixture was heated at 150 degrees C. for 3 hours, and at this point 200 parts of $SO_2$ extract was added to yield the solution of the pine oil ester of alkenyl succinic anhydride.

Example VI

To 504 parts of alkenyl succinic anhydride having an approximate $C_{11}$ hydrocarbon chain there was added 127 parts of allyl alcohol. The temperature of the mass was elevated to 150 degrees C. and maintained at that point for 3 hours. In the initial stages of the reaction there was some evidence of allyl alcohol refluxing but as the reaction proceeded to completion the refluxing gradually ceased. 200 parts of $SO_2$ extract was added with stirring to yield the solution of the allyl ester of alkenyl succinic anhydride.

Example VII

In a flask containing 504 parts of alkenyl succinic anhydride, whose hydrocarbon chain contains approximately 11 carbons atoms, there was added 200 parts of phenol which has been previously liquefied. The reaction mixture was heated to 150 degrees C. for 3 hours. There was some indication that the esterification reaction did not proceed to completion. Other experiments in which the temperature was either elevated or the heating period prolonged also failed to indicate that the esterification reaction had proceeded to 100% theory. 200 parts of $SO_2$ extract was added to the esterification product to yield a solution of the phenol ester of alkenyl succinic anhydride.

Example VIII

To 448 parts of an alkenyl succinic anhydride with a $C_8$ to $C_{10}$ range alkenyl group there was added 132 parts of 99% isopropanol. The mixture was heated under reflux at 150 degrees C. for 3 hours. The progress of the reaction was followed by the rate of refluxing of the isopropanol. When the reaction had proceeded to practical completion there was no evidence of the isopropanol refluxing. 200 parts of SO$_2$ extract was added with stirring to the reaction mass to yield a solution of the isopropanol ester of alkenyl succinic acid having a C$_8$ to C$_{10}$ range alkenyl group.

*Example IX*

To 192 parts of alkenyl succinic anhydride having a C$_6$ to C$_8$ range alkenyl group there was added 132 parts of 99% isopropanol. The mixture was heated under reflux at 150 degrees C. for 3 hours. The progress of the esterification of the reaction was followed by observation of the rate of refluxing as previously indicated. 200 parts of SO$_2$ extract was added with stirring to yield a solution of the isopropanol ester of alkenyl succinic anhydride having a C$_6$ to C$_8$ range alkenyl group.

*Example X*

The esters as prepared in accordance with Examples IV, V, VI, VII, VIII, and IX were neutralized with aqueous ammonia to form the mono-ammonium salts of the corresponding esters. The resulting mixed ester salts were extremely soluble in water and alkaline solutions. The salts exhibited extremely effective surface-active characteristics and extremely high wetting power. With the exception of the salts of the phenol ester the products were dispersible in acid solutions and showed good wetting power.

*Example XI*

The esters as prepared in accordance with Examples IV to IX, inclusive, were neutralized with butylamine. The resulting mixed salt esters were soluble in water and basic solutions and exhibited strong surface-active properties and showed high wetting power. With the exception of the salts of the phenol ester the products were readily dispersible in acid solutions.

*Example XII*

The mono-esters as prepared in accordance with Examples IV to IX, inclusive, were neutralized with aniline. These mixed salt esters were slightly soluble or dispersible in water and alkaline solutions. The wetting action and surface-active characteristics were somewhat less than either the ammonium or butylamine salts. The salts were all dispersible in acid solutions with only slight surface-active action.

*Example XIII*

The mono-esters as prepared in accordance with Examples IV to IX, inclusive, were neutralized with cyclohexylamine. The salts were all soluble in water and alkaline solutions. The surface-active characteristics were evident but not as pronounced as the ammonium salts. With the exception of the phenol ester the salts were dispersible in acid solutions.

*Example XIV*

The mono-esters as prepared in accordance with Examples IV to IX, inclusive, were neutralized with diethanolamine. The mixed salt esters were extremely soluble in water and basic solutions and exhibited pronounced surface-active characteristics and wetting action. The salts were dispersible or slightly soluble in acid solutions.

*Example XV*

The mono-esters as prepared in accordance with Examples IV to IX, inclusive, were neutralized with a modified triethanolamine in which the modification comprised substantial dehydration of the original triethanolamine. The mixed salt esters were slightly soluble in water and alkaline solutions with only mild surface-activity. The salts were readily soluble in acid solutions, showing some wetting action and surface-active characteristics.

*Example XVI*

126 parts of alkenyl succinic anhydride, 150 parts of water and 48 parts of 18 Bé. ammonium hydroxide were stirred until the heat of the reaction had reached the maximum temperature of 65 degrees C. Then 40 parts of isopropanol was added and the mixture was stirred until cool to yield the diammonium alkenyl succinate. This material is soluble in water and in dilute (1% by weight) solutions of caustic soda and muriatic acid. In all of these solutions the salt dissolved readily to give clear strong foaming solutions of high wetting power.

*Example XVII*

126 parts of alkenyl succinic anhydride, 150 parts of water and 28 parts of 18 Bé. ammonium hydroxide were stirred until the reaction was complete as indicated by the drop of temperature of the reaction mass. 40 parts of isopropanol was added with stirring to yield the mono-ammonium hydrogen alkenyl succinate. This salt is soluble in water, dilute acids and dilute alkalies to yield clear strong foaming solutions.

*Example XVIII*

126 parts of alkenyl succinic anhydride, 200 parts of water and 37 parts of sodium hydroxide were agitated with external heat until the mass was no longer alkaline to phenolphthalein. At this point 65 parts of isopropyl alcohol was added and agitated until the mass was cooled to yield the di-sodium alkenyl succinate. This salt dissolves readily in dilute alkalies, dilute acids and water to give a clear strongly foaming solution.

*Example XIX*

The mono-sodium hydrogen succinate was prepared in a manner similar to that described in Example XVIII with the exception that 18.5 parts of sodium hydroxide were used. The mono-sodium salt is likewise readily soluble in water, dilute alkalies and acids.

*Example XX*

126 parts of alkenyl succinic anhydride were mixed at room temperature with 37 parts of calcium hydroxide. The temperature was raised to 90 degrees C. and a reaction occurred which converted the slurry material to a simple dry mass which crumbles into a coarse powder upon working it up. The reaction results in the formation of the calcium succinate which is only difficultly soluble in water and exhibits very reduced surface-activity.

*Example XXI*

126 parts of alkenyl succinic anhydride and 148 parts of commercial triethanolamine were mixed at room temperature. On stirring an exothermal reaction occurred raising the temperature to 75 degrees C. External heat was applied to raise the temperature to 100 degrees C.

and maintained at this point. 330 parts of water were then added to yield a concentrated solution of the di-triethanolamine salt of alkenyl succinic acid. This salt dissolves easily in water and dilute alkalies and acids to give a solution having high wetting power.

*Example XXII*

126 parts of alkenyl succinic anhydride and 200 parts of water were heated to 90 degrees C. to hydrolyze the anhydride to the dibasic acid. Then 47 parts of aniline were added and the temperature was again raised to 100 degrees C. and maintained at that point for 15 minutes to yield the mono-aniline salt of alkenyl succinic acid. The resulting solution was still acid to methyl orange and 25 parts of 18 Bé. ammonium hydroxide was added to yield a mixture that was neutral to methyl orange. The resulting mixed ammonium-aniline salts of alkenyl succinic acid were rather soluble in water and dilute alkalies and acids and yielded a solution having strong foaming characteristics.

*Example XXIII*

126 parts of alkenyl succinic anhydride and 20 parts of water were heated to 90 degrees C. in order to form the dibasic acid. To the solution of the dibasic acid there were added 53 parts of diethylene triamine and the temperature raised to 100 degrees C. and maintained at that point for 15 minutes. To the mono-salt is then added 53 parts of diethanolamine and the mass heated an additional 15 minutes at 100 degrees C. to yield the necessary mixed di-salt of the succinic acid which is soluble in water and results in a solution having strong foaming action.

The above examples are only a few of the many products which may be prepared according to the principles described in the foregoing descriptions. Various examples of the many products which answer the descriptions herein made are contemplated. Some may be oil soluble, others water soluble. In many instances, the compounds may possess dual solubility to a significant degree. Even apparent insolubility is of no consequence as the intended products are all soluble at least to the extent necessary for segregation at the interface as a water wettable agent.

For resolving petroleum emulsions these agents are preferably used in the proportions of one part of chemical to from 5,000 to 50,000 parts of petroleum emulsion. The agent may be added either as the concentrated product direct to the emulsion or after diluting with a suitable vehicle. The chemical may be added batchwise or may be added intermittently by means of a conventional proportioning pump.

It is to be understood that the foregoing descriptions and examples are intended to be illustrative only and not a limitation of the scope of the invention. Any modification or variation which conforms to the spirit of the invention is intended to be included within the scope of the claims.

This application is a continuation-in-part of our copending applications Serial Nos. 15,276 and 15,277, both filed March 16, 1948, and both now abandoned.

The invention is hereby claimed as follows:

1. A process for breaking an emulsion of the water-in-oil type which comprises subjecting the emulsion to the action of a compound from the group consisting of alkenyl succinic acids, their esters and salts of said acids and esters wherein the salt-forming group is from the group consisting of alkali metal, alkaline earth metal, ammonium and amine salt-forming groups and in which the alkenyl group contains at least 5 carbon atoms and not more than 30 carbon atoms, the quantity of said compound being effective to break said emulsion.

2. A process for breaking an emulsion of the water-in-oil type which comprises subjecting the emulsion to the action of a compound from the group consisting of alkenyl succinic acids, their esters and salts of said acids and esters wherein the salt-forming group is from the group consisting of alkali metal, alkaline earth metal, ammonium and amine salt-forming groups and in which the alkenyl group contains 6 to 12 carbon atoms, the quantity of said compound being effective to break said emulsion.

3. A process for breaking an emulsion of the water-in-oil type which comprises subjecting the emulsion to the action of an ester of an alkenyl succinic acid in which the alkenyl group contains 5 to 30 carbon atoms and at least one ester group has an aliphatic hydrocarbon chain containing 6 to 30 carbon atoms, the quantity of said ester being effective to break said emulsion.

4. A process for breaking an emulsion of the water-in-oil type which comprises subjecting the emulsion to the action of a diester of an alkenyl succinic acid in which the alkenyl group contains 5 to 30 carbon atoms and each of the ester groups has an aliphatic hydrocarbon chain containing 6 to 30 carbon atoms, the quantity of said ester being effective to break said emulsion.

5. A process for breaking an emulsion of the water-in-oil type which comprises subjecting the emulsion to the action of a mono-ester salt of an alkenyl succinic acid containing 5 to 30 carbon atoms in the alkenyl group and an alcohol containing 6 to 30 carbon atoms in a hydrocarbon chain in which the salt-forming group is a salt-forming oil soluble amine, the quantity of said mono-ester salt being effective to break said emulsion.

6. A process for breaking an emulsion of the water-in-oil type which comprises subjecting the emulsion to the action of a mono-ester salt of an alkenyl succinic acid containing 5 to 30 carbon atoms in the alkenyl group and an alcohol containing 6 to 30 carbon atoms in a hydrocarbon chain in which the salt-forming group is the ammonium ion, the quantity of said mono-ester salt being effective to break said emulsion.

7. A process for breaking emulsions of the water-in-oil type which comprises subjecting the emulsion to the action of an alkali metal salt of an alkenyl succinic acid having 6 to 12 carbon atoms in the alkenyl group, the quantity of said salt being effective to break said emulsion.

8. A process for breaking an emulsion of the water-in-oil type which comprises subjecting the emulsion to the action of a mono-ester salt of an alkenyl succinic acid containing 5 to 30 carbon atoms in the alkenyl group and an alcohol containing 6 to 30 carbon atoms in a hydrocarbon chain in which the salt-forming group is butylamine.

9. A process for breaking an emulsion of the water-in-oil type which comprises subjecting the emulsion to the action of a mono-ester salt of an alkenyl succinic acid containing 5 to 30 carbon atoms in the alkenyl group and an alcohol containing 6 to 30 carbon atoms in a hydrocarbon chain in which the salt-forming group is cyclohexylamine.

WILLARD H. KIRKPATRICK.
DOYNE L. WILSON.

REFERENCES CITED

The following references are of record in the file of this patent:

UNITED STATES PATENTS

| Number | Name | Date |
|---|---|---|
| 1,977,089 | Roberts | Oct. 16, 1934 |
| 2,341,846 | Meincke | Feb. 15, 1944 |
| 2,380,699 | Kyrides | July 31, 1945 |
| 2,417,738 | De Groote | Mar. 18, 1947 |
| 2,422,822 | Blair | June 24, 1947 |
| 2,498,658 | De Groote et al. | Feb. 28, 1950 |